March 1, 1966 G. R. GAGLIARDI 3,237,241
CONTROLLED CONTINUOUS MIXER
Filed July 24, 1964 5 Sheets-Sheet 1

INVENTOR.
GENE RALPH GAGLIARDI
BY
ATTORNEYS

March 1, 1966 G. R. GAGLIARDI 3,237,241
CONTROLLED CONTINUOUS MIXER
Filed July 24, 1964 5 Sheets-Sheet 4

INVENTOR.
GENE RALPH GAGLIARDI
BY
Kenyon & Kenyon
ATTORNEYS

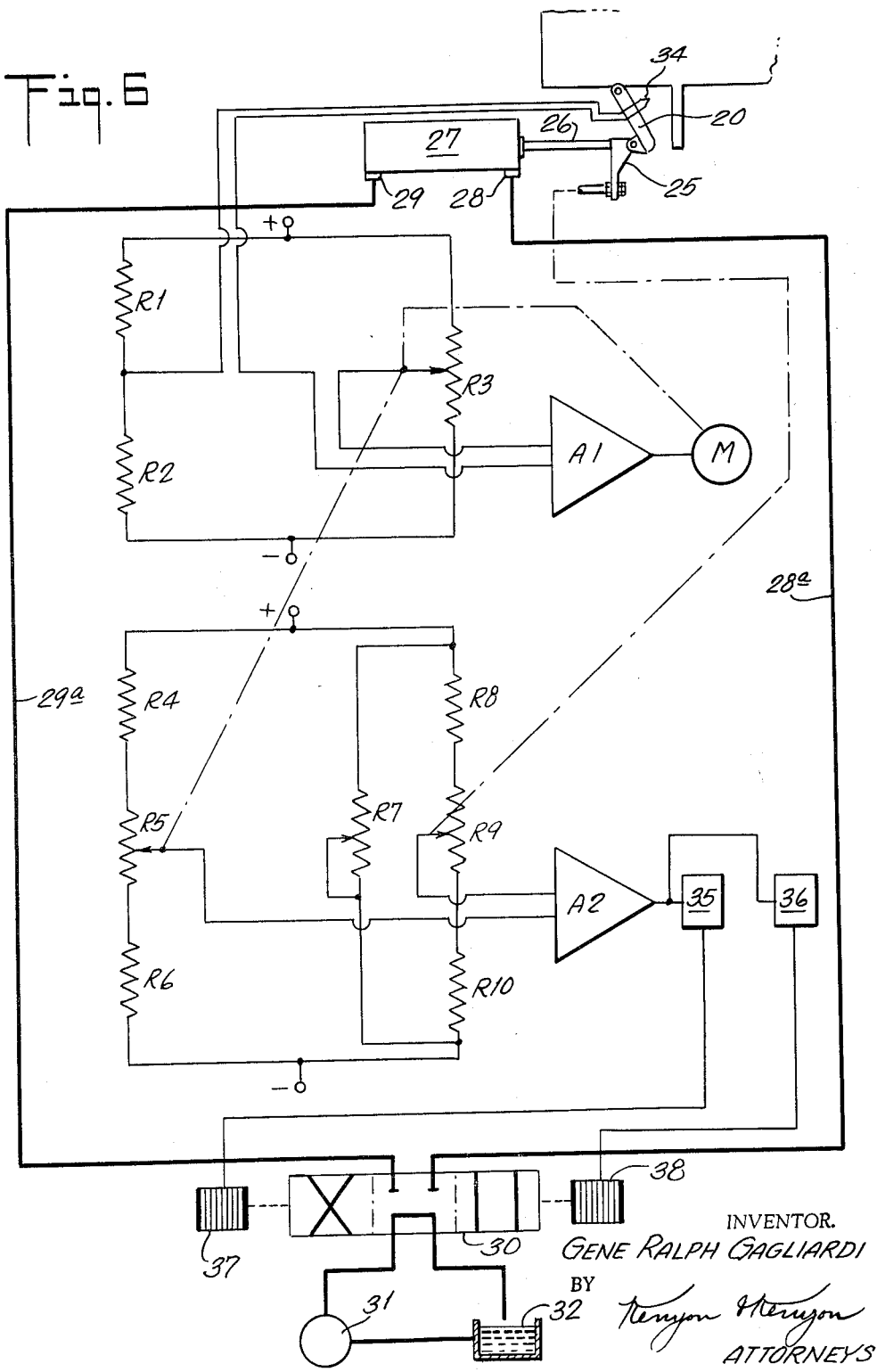

United States Patent Office 3,237,241
Patented Mar. 1, 1966

3,237,241
CONTROLLED CONTINUOUS MIXER
Gene R. Gagliardi, Bethany, Conn., assignor to Farrel Corporation, Ansonia, Conn., a corporation of Connecticut
Filed July 24, 1964, Ser. No. 385,025
4 Claims. (Cl. 18—2)

This invention relates to continuous internal mixers of the kind described by the Ahlefeld et al. U.S.A. patent application 194,814, filed May 15, 1962, now U.S.A. Patent 3,154,808.

An object of this invention is to provide for automatic control of this kind of continuous mixer. For example, once the amount of mixing energy which must be put in a given material is known, it is desirable to do so at a rapid rate without heating the material to a temperature known to damage the material. Without automatic control, it has been found that such a mixer requires close supervision by operating personnel. The present invention is for the purpose of eliminating, or at least reducing, this requirement.

The invention is summarized briefly as follows:

The continuous internal mixer described by the identified patent includes means forming at least one mixing chamber having an entrance and discharge orifice which are interspaced, and means for charging unmixed material through the entrance to displace previously charged material forwardly in the chamber and thereby discharge mixed material from this chamber and which is adjacent to or at the discharge orifice.

Therefore, the rate of movement of material through the chamber and thus the time this material is subjected to mixing action in the chamber is a variable dependent on the charging of the unmixed material through the entrance.

Rotary mixing means in the chamber continuously applies mixing energy to the material while therein, this mixing means being free from substantial interference with the material's rate of movement. Thus, a second variable is the power consumption of the mixing means, this being dependent on the amount of mixing energy absorbed by the material.

In turn, the amount of mixing energy absorbed by the material from the mixing means during the time this material is subjected to the action thereof is dependent on the pressure on the material, this being a third variable.

The temperature of the mixed material, caused by its absorption of the mixing energy, is a fourth variable. This is dependent on the rate of absorption of the mixing energy as modified by the removal of heat during the mixing. The mixing chamber is usually cooled, as by water cooling, for example.

From the above it can be seen that the continuous type of mixer, to which this invention relates, involves the following operational variables:

(1) The time during which the material receives the mixing energy.
(2) The power consumed by the mixing means.
(3) The pressure on the material which affects the amount of mixing energy the material absorbs.
(4) The temperature of the mixed material.

Due to the continuous operational characteristics of the described kind of continuous mixer, any or all of the described variables may be used through the medium of a suitable measuring means to control any of the variables to thereby assure that the material being continuously mixed has absorbed a predetermined amount of mixing energy to provide the results desired.

However, many materials are sensitive to heat and, therefore, temperature is used in the specific example of the present invention described below with the aid of the accompanying drawings.

Figure 1:
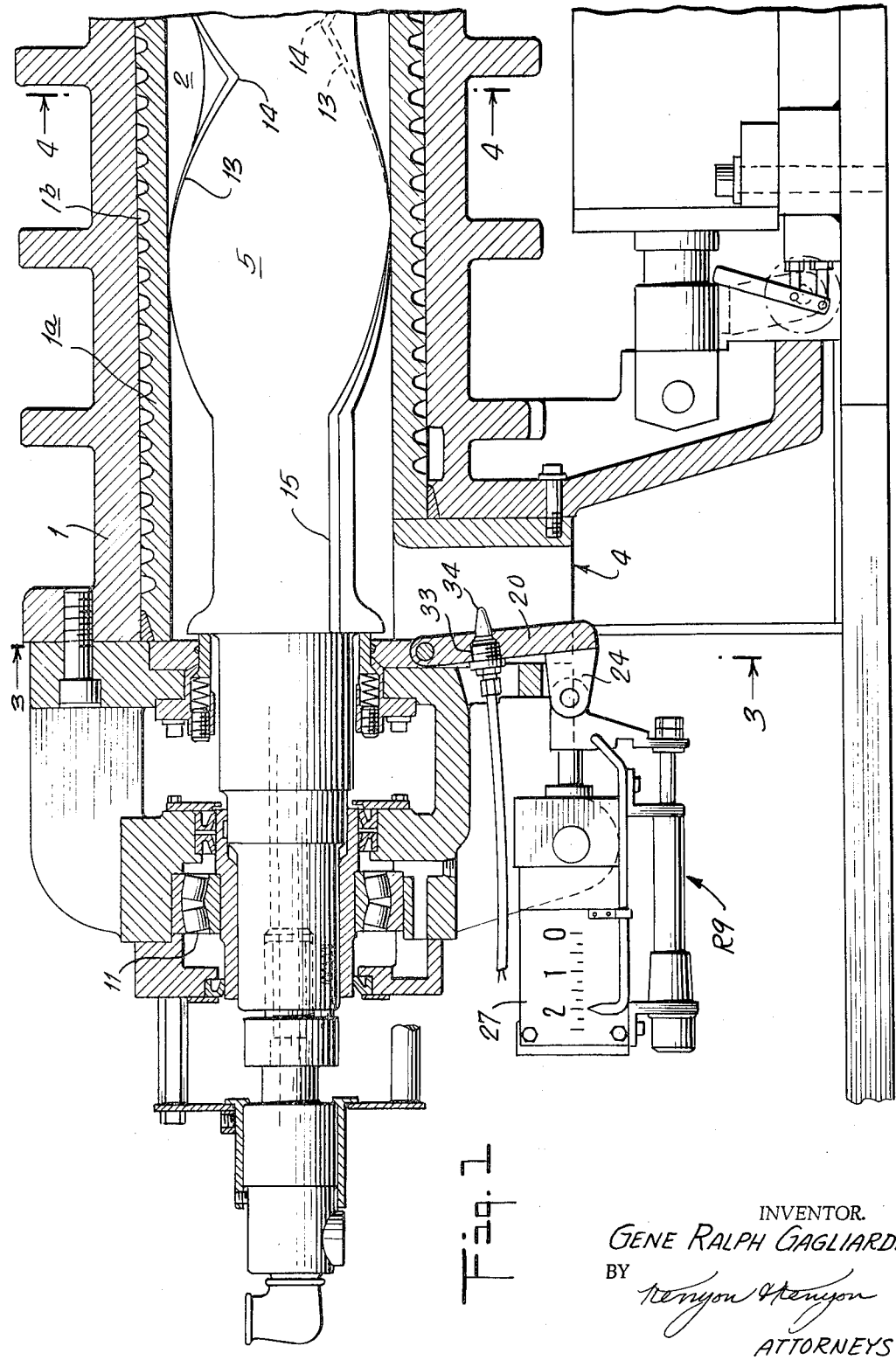
FIG. 1 is a vertical longitudinal section of the discharge end of an example of the continuous mixer described by the previously identified patent.

As shown by FIGS. 1–4, this continuous mixer comprises as its main parts the barrel 1 internally forming two mixing chambers 2, each having a charging entrance 3, formed by the axially open ends of the chambers 2, and a discharge orifice 4, the latter extending laterally from the chambers 2 and being interspaced with respect to the charging entrances 3 by the extent of the length of the chambers 2. The latter ordinarily have a length that is greater than their cross-sectional area.

Figure 3:
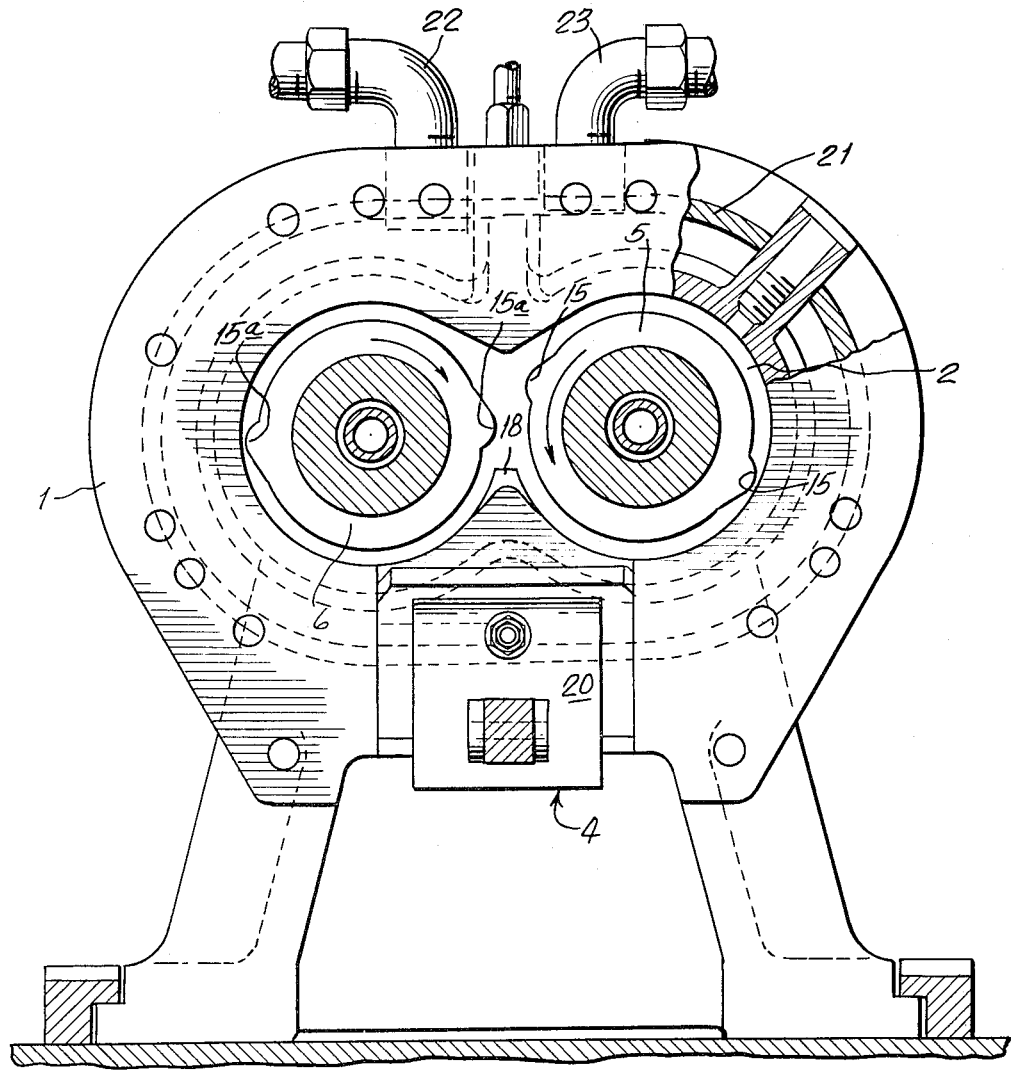
FIG. 3 is a cross-section taken on the line 3—3 in FIG. 1.
Figure 4:
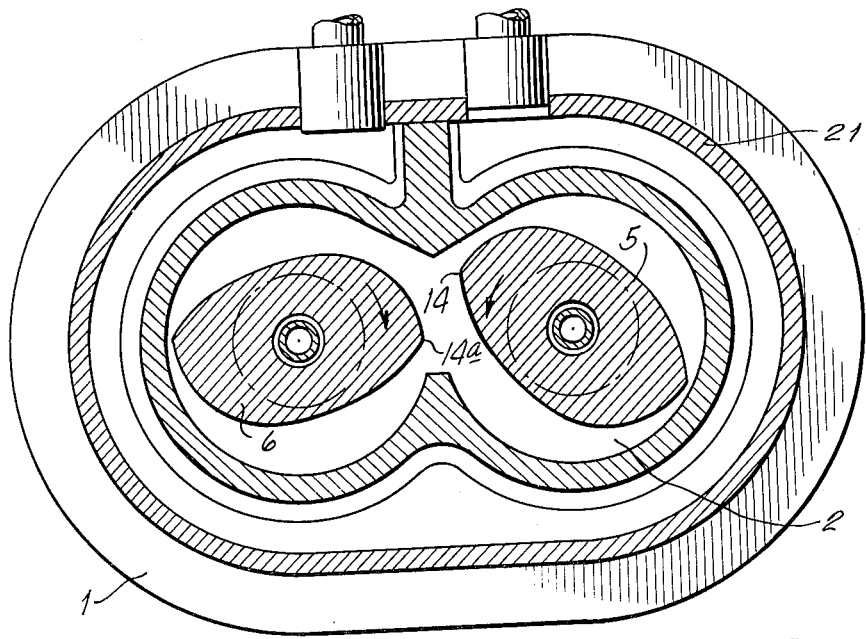
FIG. 4 is a cross-section taken on the line 4—4 in FIG. 1.

As shown by FIGS. 3 and 4, the cross-section of the barrel's interior is that of two parallel cylinders which are open radially to each other so as to give the configuration of the figure eight lying on its side.

Figure 2:
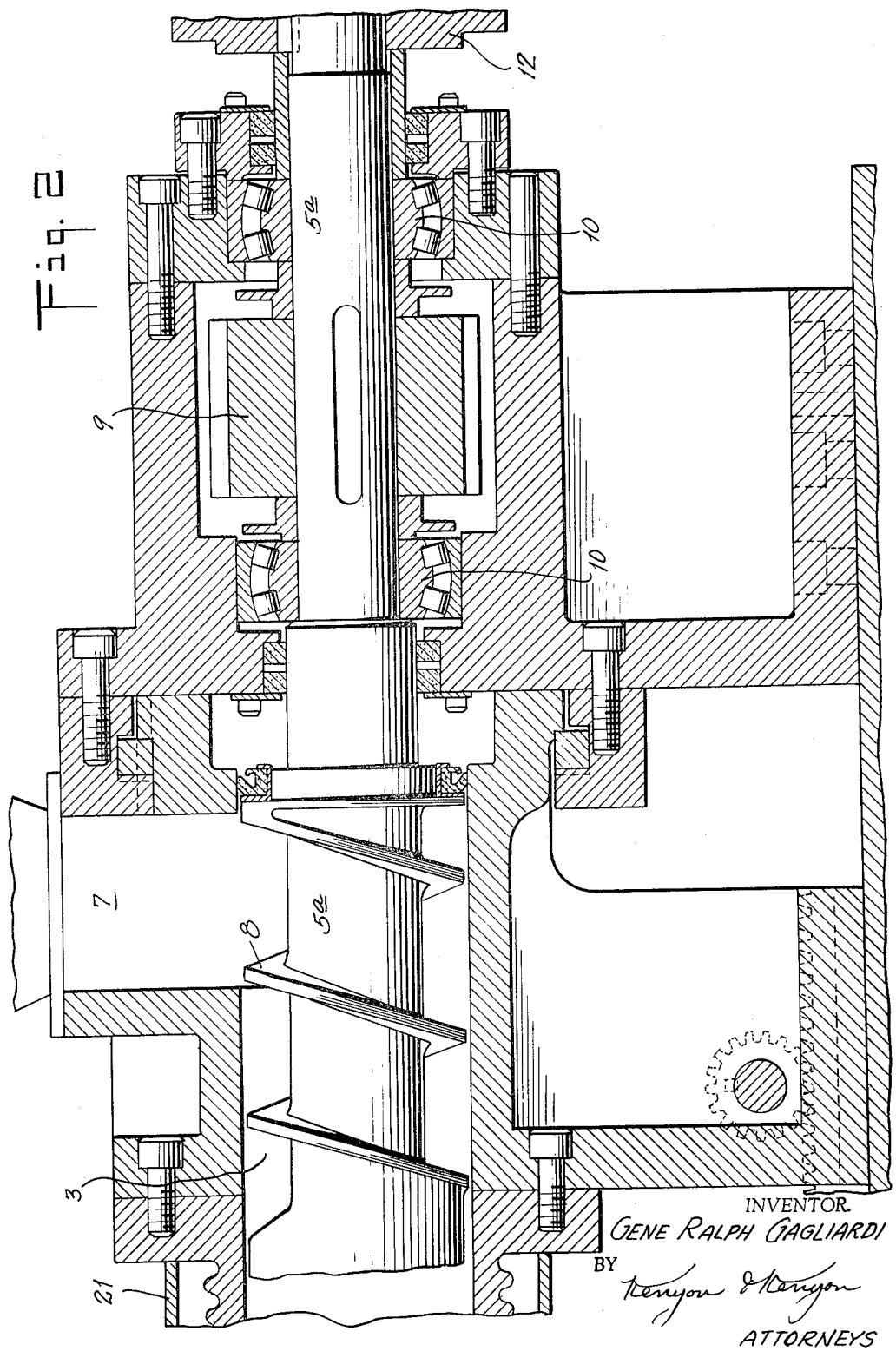
FIG. 2 is a corresponding section of the charging end.

Each of the chambers 2 contain an axially extending rotor, 5 and 6 respectively, both having shafts extending through the charging entrance 3 and under a loading port 7. FIG. 2 shows the shaft 5a of the rotor 5, the shaft for the rotor 6 being concealed from view by this shaft 5a, but being substantially identical therewith. Each shaft carries a feed screw blade 8 extending past the loading port 7, which is centrally located so as to be open to both feed screw blades. These blades fit closely within the corresponding cylindrical portions of the charging entrance 3 so that material fed through the port 7 is charged through this entrance to displace previously charged material forwardly in the chamber 2 and discharge mixed material from this chamber through the discharge orifice 4.

Although the feed screw blades 8 correspond to each other, they are oppositely pitched so that opposite rotation, or contrarotation, of the rotors 5 and 6 cause both blades to feed material and stuff it through the entrance 3 into the chambers 2 under pressure. Such opposite rotation is effected by the rotor shafts extending on backwardly where they are keyed respectively to intermeshing pinions, FIG. 2 showing one of these pinions 9, this one concealing the other.

The rotor shafts are journaled by anti-friction bearings 10, generally corresponding bearings 11 journaling those shafts which extend forwardly from the opposite ends of the rotors 5 and 6. Therefore, bearing friction losses are kept low. Power is put into the rotors by way of the shaft 5a which extends farther backwardly than does the other shaft so that its exposed end can be provided with a coupling 12 which may be connected with a large gear stand (not shown) providing a gear reduction and connecting with a motor (not shown) ordinarily of adequate potential horsepower to meet all possible mixing requirements.

The rate with which the material moves from the entrance 3 through the chamber 2 to the discharge orifice 4 is directly dependent on the rate with which material is fed to the port 7, this in turn determining the total time during which the charged material receives mixing energy. Automatic feeders are available for feeding the port 7 and, with feeding at a constant rate, the material's residence time in the mixer need not vary.

The power consumed by the rotors 5 and 6, and therefore the power absorbed by the material being mixed, may be determined by the horsepower requirement of the shaft 5a through which the total horsepower consumption of the two rotors must be transmitted. This power consumption may be measured in any conventional way, as by determining the number of watts consumed by an electric motor such as is commonly used with this kind of mixer. Bearing and gear losses must be considered in any such method.

The rotors 5 and 6 must have a configuration which imparts adequate mixing energy to the material in the mixing chamber for the dimensions of this chamber, keeping in mind practical considerations of size, reasonable rotor speeds, and the like. The rotors should not affect the rate of movement of the material through the chambers to a material degree. If they do, the time variable cannot be predetermined accurately. These rotors can be driven at a constant rotative speed so that for any given time and pressure they put mixing energy into the material at a constant rate.

As shown by FIG. 4, the cross-sectional contour of these rotors corresponds generally to the cross-sectional design of Banbury type rotor blades. The difference is that, as shown by FIG. 1, the oppositely projecting blades 13 each starts out at its loading or right-hand end with a twist or helical section that generally turns away from or backwardly relative to the rotor rotation, until at a location spaced between the ends of the rotor. Then the blade continuously and without interruption twists in the opposite direction, towards the discharge or left-hand end of the rotor. A point or apex 14 joins the two portions.

Because the rotors contrarotate, the twist of the helical portions of the oppositely extending blades of each rotor is opposite to the pitch of the corresponding blade portions of the other.

Both rotors, excepting for the relationship of their oppositely pitched blades, may be substantially identical. The corresponding blade points or apices of the rotor 6 are marked 14a in FIG. 4. The blade tips are spaced from the chambers' inside walls. The blades of the rotors overlap the mouth of the orifice 4, as shown by FIG. 1. These blade portions may be helical or, as shown by FIG. 1, may change to blades that are linear as shown at 15 in FIGS. 1 and 3, the corresponding linear blade portions of the rotor 6 being marked 15a. These linear blade portions have the advantage that they serve to stuff the mixed material through the mouth of the orifice 4 to a somewhat better degree than if they had the helical shape.

As described by the identified patent the rotors' blades, sometimes called wings, are designed to impart oppositely directed axial forces to the material so that the net effect is that the material is not forced to travel axially from the charging end to the discharging orifice of the mixing chambers. There is no overall screw feeding action.

As in the Banbury type mixer, the rotors in the present instance drive the material ahead of the blades while smearing the material against the chambers' walls and extruding it backwardly through the space between the blade tips and these walls. Behind the blades the material canitates, its degree of solidarity there depending on the pressure on the material. The orifice 4 provides resistance to the discharge of mixed material, so the material is under pressure while being mixed.

Material residence time and rotor speed variables may be easily fixed constant. Pressure and, therefore, the mixing energy absorption rate, require more attention.

Figure 5:
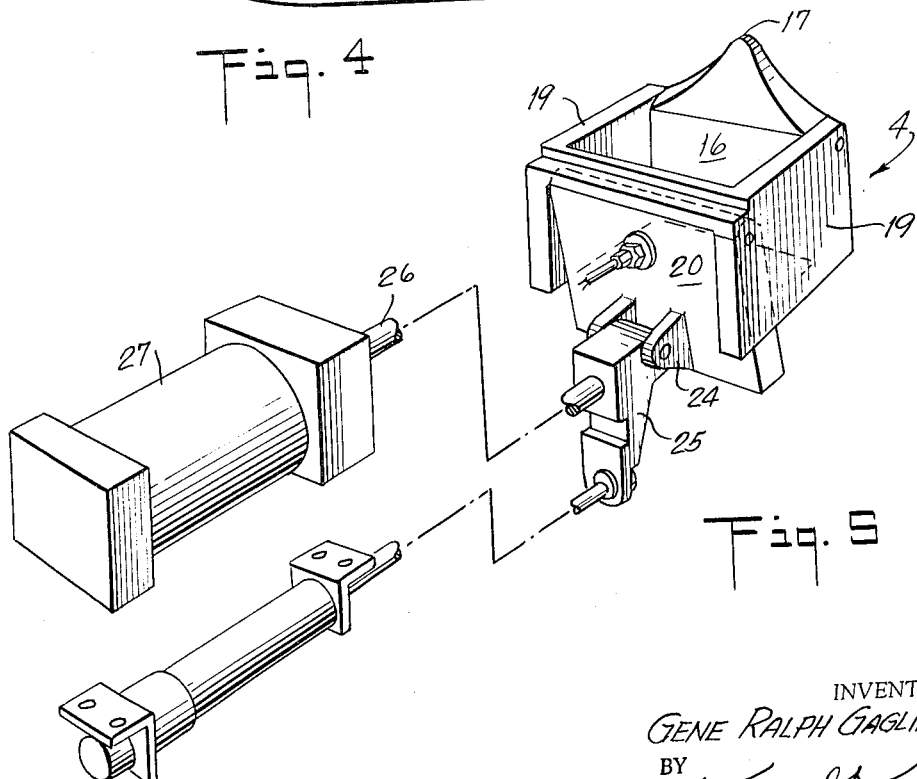
FIG. 5 is a perspective view showing the mechanical elements used to control the pressure of the material during its mixing to thereby control its degree of mixing energy absorption; and, FIG. 6 schematically shows an electrical and hydraulic control system for actuating the mechanical elements of FIGURE 5.

The orifice 4 is formed by an assembly that may be removed from the barrel 1, the assembly being shown in detail by FIG. 5 in particular.

This orifice assembly has a front wall 16 that extends upwardly to a point 17 while tapering in thickness to this point, the latter being located, when the assembly is installed, directly behind the short upstanding flat-topped wall 18 where the lower mutually adjacent portions of the two chambers 2 join together. The space above the top of this wall provides the lateral intercommunication between the two chambers.

The assembly 4 further includes side walls 19 and a back wall 20 which is hinged so that it may be swung inwardly toward the wall 16 more or less. It is the upper portion of this wall 20 that is hinged so that its lower portion swings.

A relatively long discharge orifice is thus formed. In cross section it has a depth at its top in the axial direction of the chambers that is relatively small as compared to the overall length of these chambers and the two rotors, and it has a width that is substantially greater than its depth. The mouth of the orifice is located centrally across the junctions of the two chambers and, as previously indicated, at least mainly in overlapped relation with respect to the portion of the rotors' blades adjacent thereto. The walls of this orifice assembly extend transversely from the rotors to form what is substantially a rectangular tube long enough to cause substantially increased restraint to the discharge of the mixed material therethrough, as compared to what might be called simply a rectangular hole formed in the barrel. The restraint is frictional to a substantial degree, and is dependent on cross-sectional size.

Because of this restraint to the discharge of the mixed material from the barrel's chambers, and considering the action of the rotors' feed screw blades 8, the material being mixed is placed under pressure. This pressure in turn is one of the variables determining the amount of mixing energy the material absorbs from the rotors. To the degree that it absorbs this energy the material is heated, its ultimate temperature depending on heat loss while receiving the energy as well as the amount of the latter.

Assuming that the rotors are powered adequately to meet all possible mixing conditions, and are turned at a constant speed, and that the rate at which the material is fed to the port 7 is maintained substantially constant, as by the use of adequately accurate feeding equipment such as is commercially available, the amount of mixing energy absorbed by the material during the time it is subjected to the mixing action, may be controlled by opening and closing action of the wall 20.

As previously indicated, water or other liquid cooling of the barrel 1 may be resorted to. Thus, the barrel is shown in FIG. 1 as being provided with a lining 1a forming liquid cooling passages 1b supplied with cooling liquid by suitable connections (not shown). In FIGS. 2–4 the barrel is shown as being surrounded by a liquid cooling jacket 21 having inlet and outlet connections 22 and 23 for cooling liquid flow.

The use of such cooling, usually by water, to remove heat constantly during the mixing operation is for the purpose of preventing excessive temperatures, by removing heat constantly from the material. However, excessive temperatures may result if the pressure on the material increases to a degree where the material receives so much mixing energy that the resulting heat is beyond the cooling capacity of the cooling system used. On the other hand, if the pressure drops too low the material will not receive adequate mixing energy during its travel through the chambers at the rate predetermined as being correct for a predetermined pressure on the material.

With the foregoing in mind, as shown by FIGS. 1, 5 and 6, the swinging wall 20 is provided with a bracket 24 through which it pivotally connects with a cross-head 25 connected with the piston rod 26 of a piston (not shown) contained within a cylinder 27 mounted to permit the piston and rod to apply opening and closing motion to the wall 20 which acts like a partially closed door.

This cylinder has hydraulic fluid connections 28 and 29, as indicated in FIG. 6, supplied with hydraulic fluid by pipes 28a and 29a connected through a four-way valve 30 with a source of hydraulic pressure such as the pump indicated at 31, and with a tank 32 from which the pump 31 draws its supply of liquid. This valve 30 is of the normally centered type where the pump 31 connects directly with the tank 32, and the two pipes 28a and 29a are hydraulically locked so that the piston rod 26 remains stationary holding the swinging wall 20 against movement. When the valve shifts to the right, the piston rod 26 moves to the left, and when the valve shifts to the left, the piston rod 26 moves to the right with corresponding opening and closing movements of the door or wall 20, recentering of the valve locking the wall against any movement.

The temperature of the discharged mixed material is measured right in the orifice 4 as it is forced along the swinging wall 20, the latter inclining with respect to the discharged flow and mounting temperature sensing element 33 having its sensitive element or thermocouple 34 directly in the path of the discharged material although covered by a protective shell of high conductivity metal.

FIG. 6 shows in general form a suitable control system. Assuming that the mixer is in operation with the orifice size, determined by the position of the wall 20, say 50% open, the electrical measuring bridge circuit formed by the resistances R1, R2 and R3, is in a balanced condition. The valve 30 is centered and the swinging wall 20 is locked against movement.

Assuming that the barrel is cooled at a constant rate, that the rotor speed is constant and that the rate of material feeding to the port 7 is constant, the temperaure of the discharged material should likewise remain constant as a matter of theory.

Under actual working conditions it has been found that such consistency of operation is not obtained at all times. Any variation is reflected quickly in the temperature of the discharged material. In most, if not all, instances this temperature should not be permitted to vary to any substantial degree. If the temperature drops it is an indication that the material is receiving less mixing energy than is required, and improper mixing will result. If the temperature increases the material may be damaged.

Now, assuming that the temperature of the discharging material drops somewhat, say about 10%, resistance R3 is shifted by a motor M energized through an amplifier A1 by the unbalanced condition, the shift being in a direction to bring the bridge back into balance at which time the motor M stops. Shifting of the resistance R3 shifts resistance R5 to a new point, the two being variable and mechanically interconnected, and unbalances a control bridge circuit consisting of the resistances R4, R5, R6, R7, R8, R9 and R10. A second amplifier A2 detects the unbalance of this second bridge and through relays 35 and 36, energizes one or another of actuators 37 and 38 which shift the valve 30 one way or the other. In this instance, since the temperature has dropped the valve 30 will be shifted to the left so that the wall 20 moves inwardly or towards closed. The cross-head 25 is mechanically connected to the resistance R9 so that the second bridge rebalances when the wall is moved appropriately.

An increase in the temperature of the discharging material will result in an opposite actuation.

The control circuitry of FIG. 6 is described briefly because it may actually be a commercially available instrument of the Leeds-Northrop type incorporating the measuring and control circuit elements described.

In the foregoing manner, each time the temperature of the discharging material drifts from the predetermined temperature, the discharging orifice's flow choking effect, and therefore the pressure on the mixing material, is varied to bring the temperature back to that for which the equipment is set. This temperature may be determined initially for any given material by experiment, and can be that which prevails when that material is given the desired amount of mixing energy for a fixed transit time in the mixture, a fixed rotor speed, and a fixed heat abstraction rate. Thereafter, with the temperature of the discharge material held substantially constant by the described control of the pressure on the material being mixed, uniform mixing action is obtained automatically and the main object of this invention is accomplished.

What is claimed is:

1. A continuous internal mixer comprising a barrel forming two laterally interconnecting substantially cylindrical and mutually parallel chambers having at one end a common discharge orifice, bladed rotors located in said chambers, means for receiving the material to be mixed and stuffing under pressure into said chambers at a location spaced from said discharge orifice, means for rotating said rotors, each of said rotors having a blade with a cross section that is substantially like that of a Banbury-type blade and having a portion that twists away from its direction of rotation and a portion that twists in the opposite direction, the length and twist ratio between said oppositely twisting portions of said blade being such that when said chambers contain said material the average of the axially directed forces applied to the latter by said blades is insufficient to force the material through said orifice, whereby the overall axial travel of said material through said chambers is dependent on the rate at which it is received by the first named means, said discharge orifice opening transversely from said chambers and having a depth in the axial direction of said chambers that is relatively small as compared to the overall length of said chambers and rotors, and having a width that is substantially greater than its depth, said orifice being located centrally across the junctions of said chambers and at least mainly in overlapped relation with respect to the portions of said blades adjacent thereto, said orifice being provided with walls which extend transversely from said rotors to form what is substantially a rectangular tube long enough to cause substantially increased restraint to said material when discharging therethrough; and means for varying the interspacing of two of said walls to vary said restraint, said means for varying said interspacing being a controllable powered means, and temperature sensing means located to measure the temperature of the heat created in said material by said rotors, and means automatically responsive to said temperature sensing means for controlling said power means for varying the interspacing of said two walls of said orifice.

2. A continuous internal mixer comprising a barrel forming two laterally interconnecting substantially cylindrical and mutually parallel chambers having at one end a common discharge orifice, bladed rotors located in said chambers, means for receiving the material to be mixed and stuffing under pressure into said chambers at a location spaced from said discharge orifice, means for rotating said rotors, each of said rotors having a blade with a cross section that is substantially like that of a Banbury-type blade and having a portion that twists away from its direction of rotation and a portion that twists in the opposite direction, the length and twist ratio between said oppositely twisting portions of said blade being such that when said chambers contain said material the average of the axially directed forces applied to the latter by said blades is insufficient to force the material through said orifice, whereby the overall axial travel of said material through said chambers is dependent on the rate at which it is received by the first named means, said discharge orifice opening transversely from said chambers and at least mainly in overlapped relation with respect to portions of said blades adjacent thereto; said blades each extending continuously without interruption for its entire length and forming a straight portion extending substantially parallel to the rotor's axis and located at its end which is overlapped by said discharge orifice, said discharge orifice having controllable means for variably resisting the discharge of said material therethrough to thereby control the pressure of said material in said chambers, said material heating from the mixing energy it absorbs from said rotors, means for measuring the extent of said heating and means responsive to this measuring means for controlling said controllable means.

3. A continuous internal mixer including means forming a mixing chamber having an entrance and a discharge orifice which are interspaced, means for forcibly charging unmixed material through said entrance to apply pressure on previously charged material in said chamber and to discharge mixed material from this chamber through said discharge orifice, whereby the rate of movement of material through said chamber and thus the time this material is subjected to mixing action in said chamber is a variable dependent on the charging of said unmixed material through said entrance by the second means, rotary mixing means in said chamber for continuously applying mixing energy to material while therein and which is free from substantial interference with said rate of movement, the power consumption of said mixing means being a variable dependent on the amount of mixing energy absorbed by said material, the amount of mixing energy absorbed by said material from said mixing means during the time this material is subjected to the action thereof being dependent on said pressure as a variable, the heating of said mixed material being a variable dependent on the amount of said mixing energy absorbed thereby from said mixing means, means for measuring at least one of said variables, and means responsive to said measuring means for controlling at least one of said variable, said means for measuring said varible comprising a temperature measuring means for measuring the temperature resulting from the absorption of mixed energy by said mixing means, and said means responsive to said measuring means comprising means responsive thereto for controlling the resistance of said discharge orifice to the movement therethrough of said mixed material, whereby to control the pressure on said material in said chamber and therefore, its temperature.

4. A continuous internal mixer including means forming a mixing chamber having an entrance and a discharge orifice which are interspaced, means for forcibly charging unmixed material through said entrance to apply pressure on previously charged material in said chamber and to discharge mixed material from this chamber through said discharge orifice, whereby the rate of movement of material through said chamber and thus the time this material is subjected to mixing action in said chamber is a variable dependent on the charging of said unmixed material through said entrance by the second means, rotary mixing means in said chamber for continuously applying mixing energy to material while therein and which is free from substantial interference with said rate of movement, the power consumption of said mixing means being a variable dependent on the amount of mixing energy absorbed by said material, the amount of mixing energy absorbed by said material from said mixing means during the time this material is subjected to the action thereof being dependent on said pressure as a variable, the heating of said mixed material being a variable dependent on the amount of said mixing energy absorbed thereby from said mixing means, means for measuring at least one of said variables, and means responsive to said measuring means for controlling at least one of said variables, said means for measuring said variable comprising a temperature measuring means for measuring the temperature resulting from the absorption of mixing energy by said material from said mixing means, said orifice being formed as a passage extending from said chamber and having at least one wall movable inwardly to control the resistance of this passage to the movement of said mixed material therethrough, and including a controllable operator for powering said wall to move inwardly and outwardly with respect to said passage, and means responsive to said measuring means for controlling said operator.

References Cited by the Examiner
UNITED STATES PATENTS

| | | |
|---|---|---|
| 1,743,302 | 1/1930 | Allen. |
| 1,949,199 | 2/1934 | Foote. |
| 2,566,854 | 9/1951 | Rhodes. |
| 2,747,224 | 5/1956 | Koch et al. 18—2 XR |
| 2,977,631 | 4/1961 | Komarek et al. 18—2 XR |
| 3,111,707 | 11/1963 | Buckley 18—2 |

WILLIAM J. STEPHENSON, *Primary Examiner.*